(12) United States Patent
Miyajima et al.

(10) Patent No.: US 9,223,132 B2
(45) Date of Patent: Dec. 29, 2015

(54) OPTICAL SCANNING DEVICE, METHOD FOR MANUFACTURING THE OPTICAL SCANNING DEVICE, AND IMAGE FORMING APPARATUS

(71) Applicant: CANON KABUSHIKI KAISHA, Tokyo (JP)

(72) Inventors: Yu Miyajima, Utsunomiya (JP); Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/272,139

(22) Filed: May 7, 2014

(65) Prior Publication Data

US 2014/0333711 A1 Nov. 13, 2014

(30) Foreign Application Priority Data

May 9, 2013 (JP) ................................. 2013-099041

(51) Int. Cl.
*G02B 26/12* (2006.01)
*B41J 2/47* (2006.01)

(52) U.S. Cl.
CPC .............. *G02B 26/127* (2013.01); *B41J 2/473* (2013.01); *Y10T 29/4978* (2015.01)

(58) Field of Classification Search
CPC .............. B41J 2/47; B41J 2/435; B41J 2/473; G02B 26/127; G02B 26/12; G01B 11/14; G06K 15/12; H04N 1/047; H04N 1/053
USPC .......................................... 347/225, 237, 247
See application file for complete search history.

(56) References Cited

U.S. PATENT DOCUMENTS

| | | | |
|---|---|---|---|
| 6,256,132 B1 | 7/2001 | Ishibe | |
| 6,459,520 B1 | 10/2002 | Takayama | |
| 2007/0188589 A1* | 8/2007 | Kusunose et al. | 347/238 |
| 2009/0123179 A1* | 5/2009 | Tanimura | 399/151 |

FOREIGN PATENT DOCUMENTS

| | | |
|---|---|---|
| JP | H06-86036 A | 3/1994 |
| JP | 2000-89148 A | 3/2000 |
| JP | 2001-59945 A | 3/2001 |
| JP | 2004-46116 A | 2/2004 |
| JP | 2004-302062 A | 10/2004 |
| JP | 2005-099673 A | 4/2005 |

\* cited by examiner

*Primary Examiner* — Sarah Al Hashimi
(74) *Attorney, Agent, or Firm* — Canon USA, Inc. IP Division

(57) ABSTRACT

An optical scanning device includes a deflector configured to deflect a plurality of light beams emitted from a plurality of light emitters that are mutually spaced apart in a sub-scanning direction; an incident optical system configured to steer the plurality of light beams so as to be incident on the deflector; an imaging optical system configured to steer the plurality of light beams so as to be obliquely incident on a surface to be scanned and to form images of the plurality of light emitters on the surface to be scanned; and a correction unit configured to correct a jitter of at least one of the plurality of light beams in a main scanning direction on the basis of irradiation position information, in the sub-scanning direction, of at least one light beam among the plurality of light beams at a point corresponding to the surface to be scanned.

11 Claims, 10 Drawing Sheets

OPTICAL SCANNING DEVICE, METHOD FOR MANUFACTURING THE OPTICAL SCANNING DEVICE, AND IMAGE FORMING APPARATUS

BACKGROUND

1. Field of Art

The present disclosure relates to optical scanning devices that scan surfaces to be scanned with a plurality of beams, to methods for manufacturing such optical scanning devices, and to image forming apparatuses.

2. Description of the Related Art

In recent years, there has been an increasing demand for image forming apparatuses, such as a laser beam printer and a digital copier, to form high-resolution images at high speed. To meet such a demand, an image forming apparatus is typically provided with an optical scanning device that includes a light source, such as a semiconductor laser array, having a plurality of light emitters, and the optical scanning device scans a surface to be scanned (i.e., photosensitive drum surface) simultaneously at a plurality of locations aligned in a sub-scanning direction.

In such an optical scanning device, a plurality of light beams incident on the photosensitive drum surface may be specularly reflected and, as a result, may return to the plurality of light emitters, leading to a problem that the plurality of light emitters oscillate unstably. In addition, the specularly reflected light beams may be reflected by a surface of an imaging optical system provided in the optical scanning device, and the reflected light beams may again become incident on the drum surface, leading to a problem that a ghost image appears. To solve these problems, in an existing technique, a plurality of light beams are made to be incident on a photosensitive drum surface so as to be oblique to a normal of the photosensitive drum surface, as illustrated in FIG. 8.

The photosensitive drum surface, however, is curved in a sub-scanning section, and thus a configuration such as the one illustrated in FIG. 8 may increase mutual differences in scanning magnification among a plurality of scanning lines on the photosensitive drum surface. Consequently, as illustrated in FIG. 8, a deviation D may be generated, in a main scanning direction, between imaging positions on the photosensitive drum surface, which may produce a difference between drawing start positions of scanning lines, and thus a high-quality image may not be obtained. Hereinafter, such an imaging position deviation in the main scanning direction will be referred to as a "drum oblique incidence jitter."

U.S. Pat. No. 6,256,132 discloses an optical scanning device configured to cancel an imaging position deviation in a main scanning direction resulting from a light beam incident on an imaging lens being a convergent light beam, and a drum oblique incidence jitter. In addition, U.S. Pat. No. 6,459,520 discloses a method for correcting an imaging position deviation in a main scanning direction by electrically controlling light emission timings of a plurality of light emitters.

In the optical scanning device described in U.S. Pat. No. 6,256,132, however, the drum oblique incidence jitter is corrected on the basis of an assumption that the optical scanning device is constructed in accordance with certain design values, and thus individual differences in the drum oblique incidence jitter caused by optical and mechanical arrangement errors of each component are not taken into consideration. Therefore, the optical scanning device described in U.S. Pat. No. 6,256,132 is unable to correct the drum oblique incidence jitter accurately because individual differences are not taken into consideration. Furthermore, U.S. Pat. No. 6,459,520 merely discloses a method for correcting an imaging position deviation in the main scanning direction and does not disclose a method for correcting the drum oblique incidence jitter.

SUMMARY

The present disclosure is directed to providing an optical scanning device that can suppress deterioration of an image by accurately correcting a drum oblique incidence jitter by taking an individual difference of the optical scanning device into consideration, a method for manufacturing such an optical scanning device, and an image forming apparatus.

According to an aspect of the present invention, an optical scanning device includes a deflector configured to deflect, in a main scanning direction, a plurality of light beams emitted from a plurality of light emitters that are mutually spaced apart in a sub-scanning direction; an incident optical system configured to steer the plurality of light beams emitted from the plurality of light emitters so as to be incident on the deflector; an imaging optical system configured to steer the plurality of light beam deflected by the deflector so as to be obliquely incident on a surface to be scanned and to form images of the plurality of light emitters on the surface to be scanned; and a correction unit configured to correct a jitter of at least one of the plurality of light beams in the main scanning direction on the basis of irradiation position information, in the sub-scanning direction, of at least one light beam among the plurality of light beams at a point corresponding to the surface to be scanned.

According to another aspect of the present invention, a method for manufacturing an optical scanning device that includes a deflector configured to deflect, in a main scanning direction, a plurality of light beams emitted from a plurality of light emitters that are mutually spaced apart in a sub-scanning direction, an incident optical system configured to steer the plurality of light beams emitted from the plurality of light emitters so as to be incident on the deflector, and an imaging optical system configured to steer the plurality of light beam deflected by the deflector so as to be incident on a surface to be scanned in a direction oblique to a normal of the surface and to form images of the plurality of light emitters on the surface to be scanned includes obtaining irradiation position information, in the sub-scanning direction, of at least one light beam among the plurality of light beams at a position corresponding to the surface to be scanned; and correcting a jitter of at least one of the plurality of light beams in the main scanning direction on the basis of the irradiation position information.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the appended drawings.

First Exemplary Embodiment
Image Forming Apparatus

Figure 7:
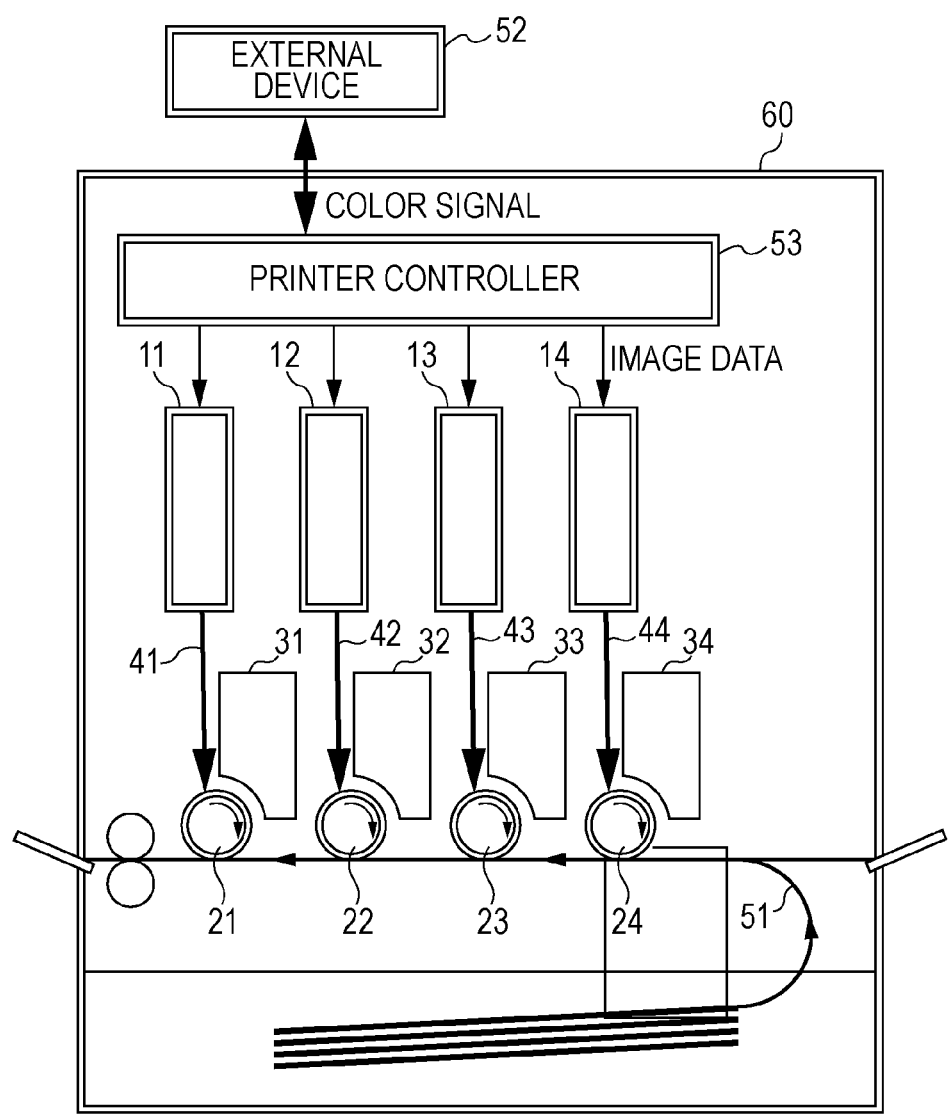
FIG. 7 is a sectional view, along a sub-scanning direction, of a primary portion of an image forming apparatus that includes an optical scanning device according to an exemplary embodiment of the present invention.
Figure 8:
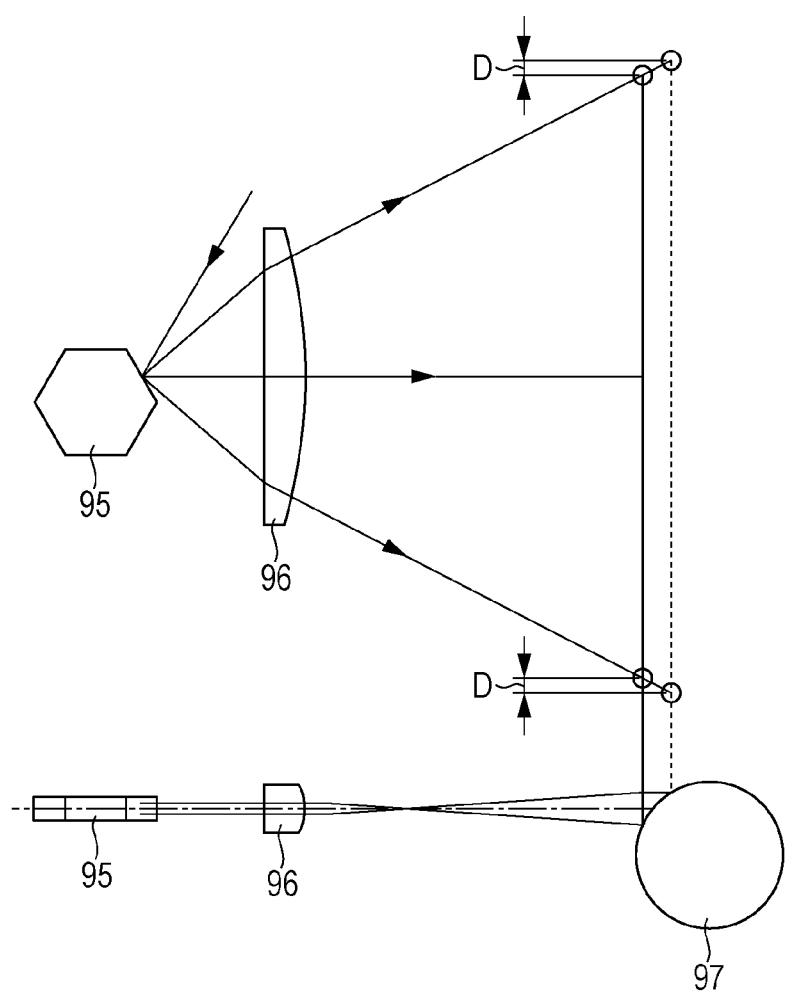
FIG. 8 illustrates a sub-scanning section of a primary portion of an existing optical scanning device.

FIG. 7 is a sectional view, taken in a sub-scanning direction, of a primary portion of an image forming apparatus, such as a laser beam printer and a digital copier, that includes an optical scanning device according to an exemplary embodiment of the present invention. Referring to FIG. 7, a color image forming apparatus 60 includes optical scanning devices 11, 12, 13, and 14, photosensitive drums 21, 22, 23, and 24, which serve as image carriers, developing units 31, 32, 33, and 34, and a transport belt 51. The color image forming apparatus 60 further includes, in addition to the developing units 31 to 34 for developing electrostatic latent images formed on the photosensitive surfaces to obtain toner images, transfer units provided in the vicinity of the photosensitive drums 21 to 24 so as to transfer the developed toner images to a receiver material. In addition, the color image forming apparatus 60 includes a fixing unit for fixing the transferred toner images to the receiver material.

Referring to FIG. 7, the color image forming apparatus 60 accepts input of R (red), G (green), and B (blue) color signals from an external device 52, such as a personal computer. These color signals are converted to pieces of image data (dot data) corresponding to C (cyan), M (magenta), Y (yellow), and B (black) by a printer controller 53. The printer controller 53 is configured to convert code data inputted from the external device 52 to image signals and input the image signals to the optical scanning devices 11, 12, 13, and 14.

These pieces of image data are inputted to the optical scanning devices 11, 12, 13, and 14. The optical scanning devices 11, 12, 13, and 14 then emit, respectively, light beams 41, 42, 43, and 44 that have each been modulated in accordance with a corresponding piece of the image data, and the photosensitive surfaces of the photosensitive drums 21, 22, 23, and 24 are scanned with the light beams 41, 42, 43, and 44, respectively, in the main scanning direction.

In the color image forming apparatus 60 of this exemplary embodiment, the optical scanning devices 11, 12, 13, and 14 emit the light beams 41, 42, 43, and 44 corresponding to the C (cyan), M (magenta), Y (yellow), and B (black) colors, respectively, to record the image signals (image information) on the respective photosensitive drums 21, 22, 23, and 24. Through this, a color image is printed at high speed.

As stated above, in the color image forming apparatus 60 of this exemplary embodiment, the optical scanning devices 11,12, 13, and 14 emit the light beams 41, 42, 43, and 44 on the basis of the image data to form latent images of corresponding colors on the respective photosensitive drums 21, 22, 23, and 24. Thereafter, the color image forming apparatus 60 forms a single full color image on a recording material through a multilayer transfer. A color image reading device provided with a CCD sensor may, for example, be used as the external device 52. In such a case, the color image reading device and the color image forming apparatus 60 form a color digital copier.

Optical Scanning Device

In the description to follow, the main scanning direction (Y direction) corresponds to a direction perpendicular to a rotational axis of a deflector and to an optical axis (X direction) of an imaging optical system (i.e., direction in which the deflector deflects the light beam for scanning). The sub-scanning direction (Z direction) corresponds to a direction parallel to the rotational axis of the deflector. A main scanning section corresponds to a plane that contains the optical axis of the imaging optical system and the main scanning direction. A sub-scanning section corresponds to a section that contains the optical axis of the imaging optical system and is perpendicular to the main scanning section.

Figure 2A:
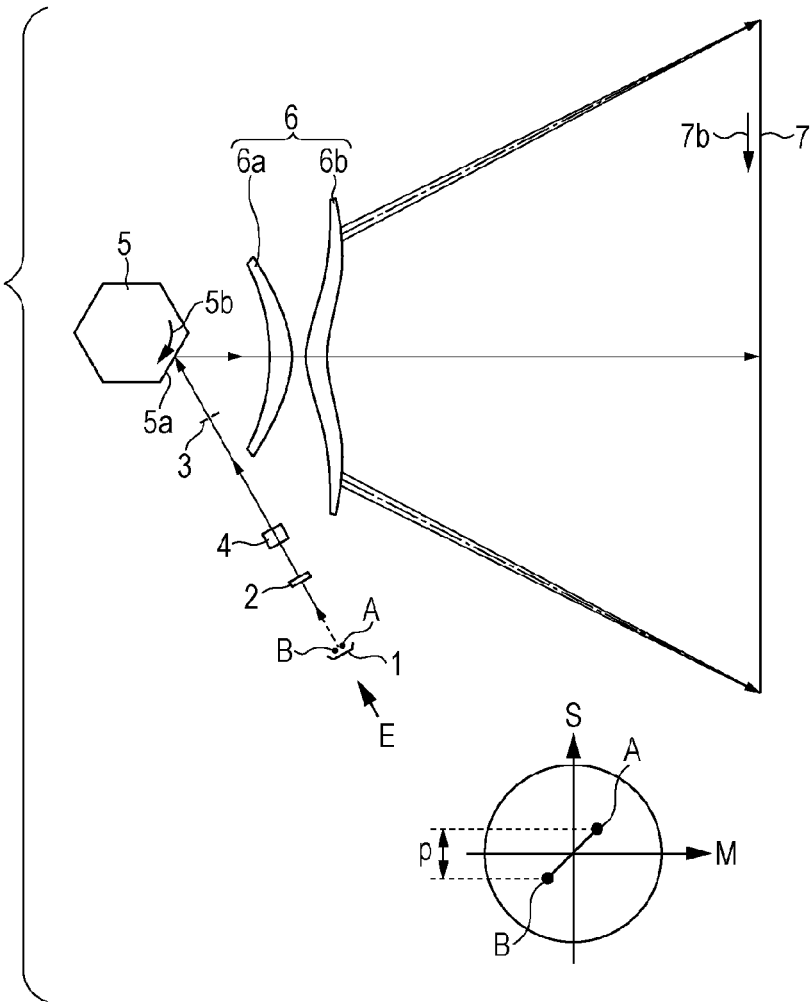
FIGS. 2A and 2B are, respectively, a main scanning section and a sub-scanning section of a primary portion of the optical scanning device according to the first exemplary embodiment of the present invention.
Figure 2B:
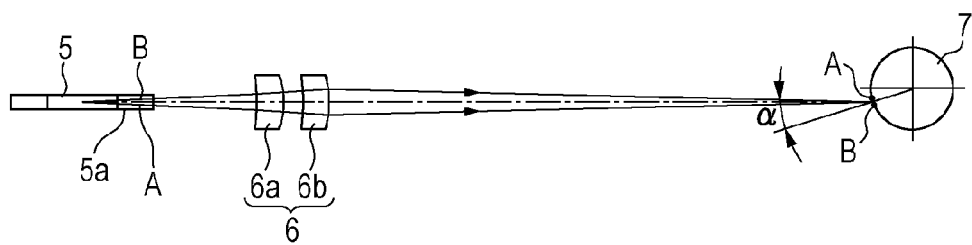

FIGS. 2A and 2B are, respectively, a main scanning section and a sub-scanning section of a primary portion of a multi-beam scanning optical scanning device according to a first exemplary embodiment. In FIG. 2A, a light source 1 is formed by a multi-beam semiconductor laser (semiconductor laser array). Here, the light source 1 is arranged such that a straight line connecting two light emitters (light emitting points) A and B, which are spaced apart in the sub-scanning direction, forms a given angle relative to the sub-scanning direction.

In FIG. 2A, a drawing enclosed by a circle illustrates the arrangement of the light emitters A and B when the light source 1 is viewed in a direction indicated by an arrow E. Hereinafter, a light beam emitted from the light emitting point A is referred to as an A laser, and a light beam emitted from the light emitting point B is referred to as a B laser. In the drawing, M indicates a direction corresponding to the main scanning direction, and S indicates a direction corresponding to the sub-scanning direction.

Referring to FIG. 2A, a condenser lens 2 serves as a first optical system. The condenser lens 2 converts a plurality of light beams emitted from the light source 1 to convergent light beams (or divergent light beams). A cylindrical lens (cylinder lens) 4 serves as a second optical system. The cylindrical lens 4 is disposed so as to have refractive power only along the sub-scanning section and images the plurality of light beams that have passed through the condenser lens 2 as substantially line images on a deflecting surface (polygon surface) 5a of a rotatable polygon mirror 5, which will be described later, within the sub-scanning section. Here, the first optical system and the second optical system form an incident optical system.

An aperture diaphragm 3 limits the width of each of the light beams that have passed through the cylindrical lens 4. The rotatable polygon mirror 5 serves as a deflector. The rotatable polygon mirror 5 rotates at a constant speed in a direction indicated by an arrow 5b through a drive unit (not illustrated), such as a motor.

An fθ lens system (scanning lens system) 6, which is an imaging optical system having fθ characteristics, serves as a third optical system. The fθ lens system 6 includes two fθ lenses (first fθ lens and second fθ lens) 6a and 6b. The fθ lens system 6 images the plurality of light beams that have been deflected by the rotatable polygon mirror 5 on a surface 7 to be scanned. In addition, the fθ lens system 6 allows the deflecting surface 5a of the rotatable polygon mirror 5 and the surface 7 to be scanned to be in a substantially optically conjugate relationship in the sub-scanning section. An optical system having such a configuration can correct a face tangle error caused by a rotational axis of a rotatable polygon mirror being tilted or by a manufacturing error of the deflecting surface 5a, and is typically referred to as an optical face tangle error correction optical system.

The surface 7 to be scanned corresponds to a photosensitive drum surface (image carrier surface). The photosensitive drum surface 7 is drum-shaped (i.e., cylindrical surface) with its rotational axis extending in the main scanning direction.

The two fθ lenses 6a and 6b are each formed, for example, from a toric lens. It is desirable that the lens surfaces of at least one of the fθ lenses 6a and 6b be aspherical in shape along a section in the main scanning direction. Such fθ lenses 6a and 6b are each formed, for example, from plastics through injection molding using a die.

In the first exemplary embodiment, the two light beams emitted from the light source (multi-beam semiconductor laser) 1 are converged through the condenser lens 2 and are then incident on the cylindrical lens 4. The plurality of convergent light beams incident on the cylindrical lens 4 are emitted from the cylindrical lens 4 without any change in the state thereof in the main scanning section, and the plurality of light beams then have the light quantity thereof limited by the aperture diaphragm 3. Meanwhile, in the sub-scanning section, the plurality of light beams are converged by the cylindrical lens 4 and then have the light quantity thereof limited by the aperture diaphragm 3. The light beams are then imaged on the deflecting surface 5a of the rotatable polygon mirror 5 as substantially line images (line images elongated in the main scanning direction).

The plurality of light beams that have been deflected by the deflecting surface 5a of the rotatable polygon mirror 5 are imaged as spots on the photosensitive drum surface 7 through the fθ lens system 6. The rotatable polygon mirror 5 is then rotated in the direction indicated by the arrow 5b so as to shift the imaging spots on the photosensitive drum surface 7 in a direction indicated by an arrow 7b (i.e., main scanning direction). Through this, an image is recorded on the photosensitive drum surface 7 serving as a recording medium.

Generation of Drum Oblique Incidence Jitter

Hereinafter, a principle on which a drum oblique incidence jitter is generated will be described in detail with reference to FIGS. 1A, 1B, 1C, 2A, and 2B. The light beams of the A and B lasers illustrated in FIG. 2A are deflected by the rotatable polygon mirror 5, which rotates at a constant speed, to thus be directed toward the photosensitive drum surface 7. The photosensitive drum surface 7 illustrated in FIG. 2B is scanned with the laser beams that are mutually parallel with a predetermined space provided therebetween in the sub-scanning direction. Although a principal ray of the A laser forming a spot A on the photosensitive drum surface 7 is not strictly parallel with a principal ray of the B laser forming a spot B, the two principal rays may be considered to be substantially parallel in the vicinity of the photosensitive drum surface 7.

Figure 1A:
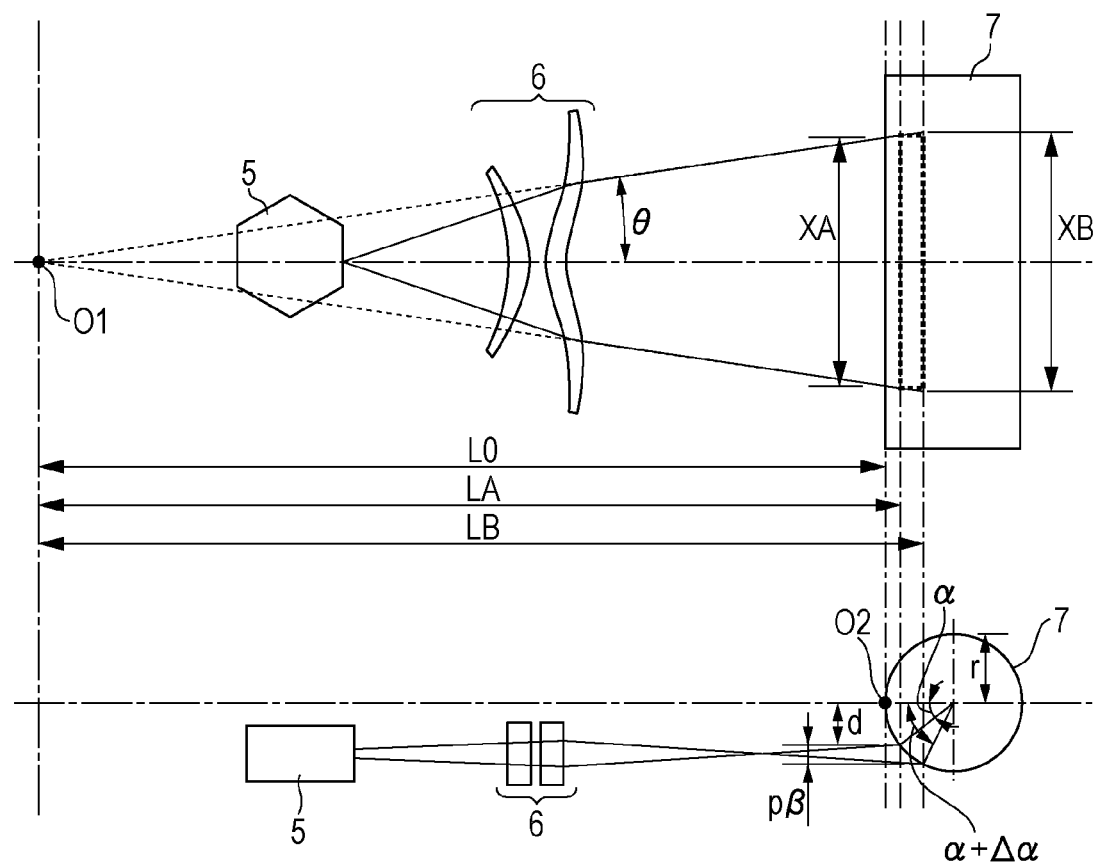
FIG. 1A is an illustration for describing a principle on which a drum oblique incidence jitter is generated.

Referring to FIG. 1A, if a light beam is incident normally on the photosensitive drum surface 7 along the sub-scanning section, an optical path length from a center point (O1 in FIG. 1A) of the main scan divergence (divergence in the main scanning direction) to the photosensitive drum surface 7 (hereinafter, the distance from the point O1 serving as the reference will be referred to as an "optical path length" for the sake of simplicity) is denoted by L0.

There is, however, a problem that a returning light beam to the light source 1 is generated, and the first exemplary embodiment solves such a problem. Specifically, since the laser beams are made to be obliquely incident at an angle of incidence α or greater along the sub-scanning section, optical path lengths LA and LB of the A laser and the B laser, respectively, are greater than L0 and are mutually different, where a relation of LA<LB is satisfied. To be more specific, the A laser has an angle of incidence α of 5.739°, and the B laser has an angle of incidence that is equal to or greater than α.

Here, the optical path lengths LA and LB of the respective A and B lasers from the center point (O1 in FIG. 1A) of the main scan divergence to irradiation positions on the photosensitive drum surface 7 are mutually different, which indicates that the scanning magnifications of the A and B lasers on the photosensitive drum surface 7 are mutually different. In other words, as illustrated in FIG. 1A, the scanning length relative to an effective pixel range of a single scanning line, in the main scanning direction, on the photosensitive drum surface 7 differs for each laser. When the scanning length of the A laser is denoted by XA and the scanning length of the B laser is denoted by XB, a relation of XA<XB is satisfied. The relative difference between the scanning lengths generates an imaging position deviation in the main scanning direction (i.e., drum oblique incidence jitter).

The drum oblique incidence jitter occurs equally at a drawing start side and at a drawing end side in the main scanning direction. Hereinafter, unless specifically indicated, the "drum oblique incidence jitter" refers to a drum oblique incidence jitter that is generated at one of the drawing start side and the drawing end side in the main scanning direction. In this manner, the drum oblique incidence jitter is defined by a relative difference, in the main scanning direction, of a given imaging position from an imaging position of a laser beam serving as a reference among a plurality of light beams. Here, the light beam serving as the reference is referred to as a "reference light beam," and the remaining light beams are referred to as "general light beams." In the first exemplary embodiment, the A laser light beam serves as the reference light beam, and the B laser light beam serves as a general light beam.

Figure 1B:
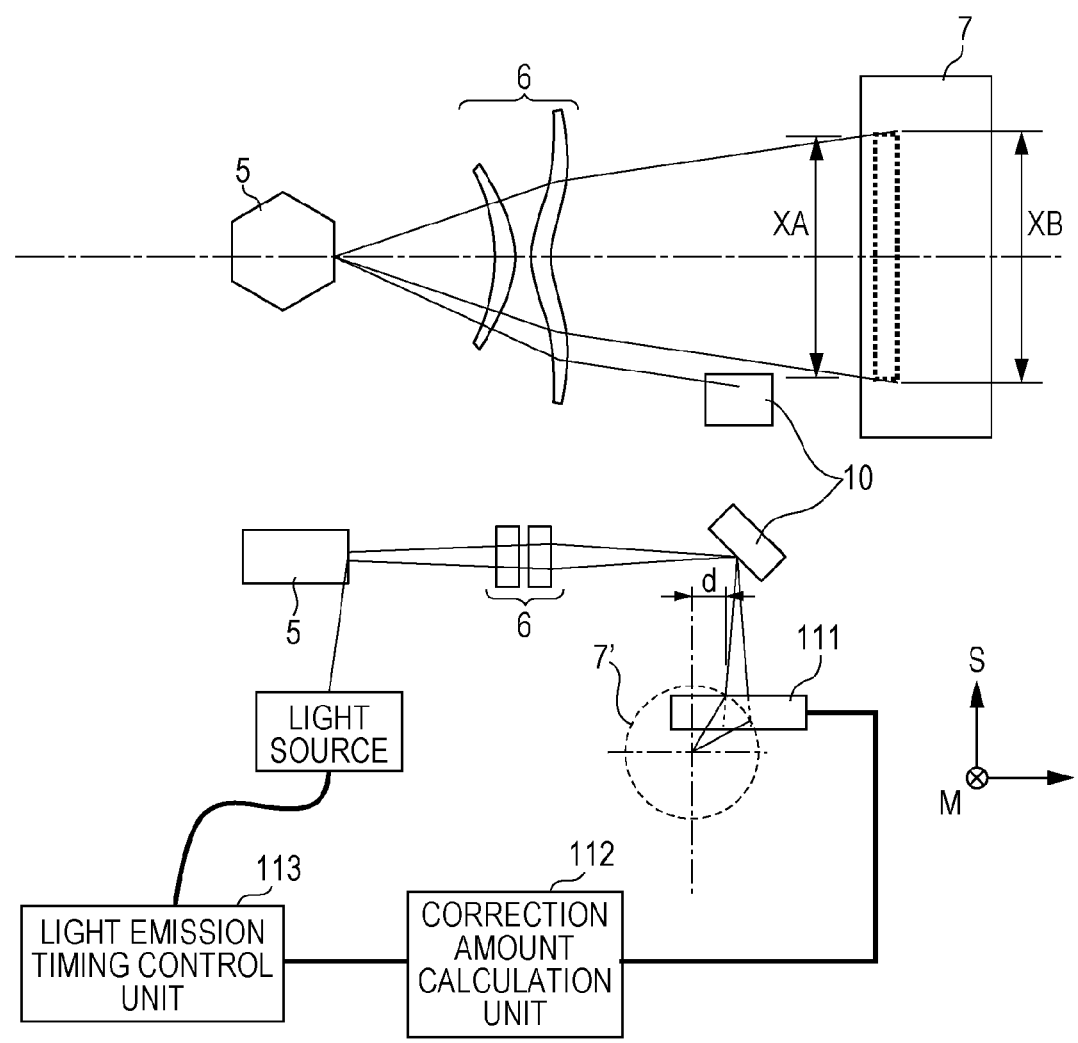
FIG. 1B illustrates an optical scanning device according to a first exemplary embodiment of the present invention, specifically illustrating a main scanning section and a sub-scanning section of an optical scanning device that is provided with a measuring unit for measuring an obliquely incident position in a sub-scanning direction.
Figure 1C:
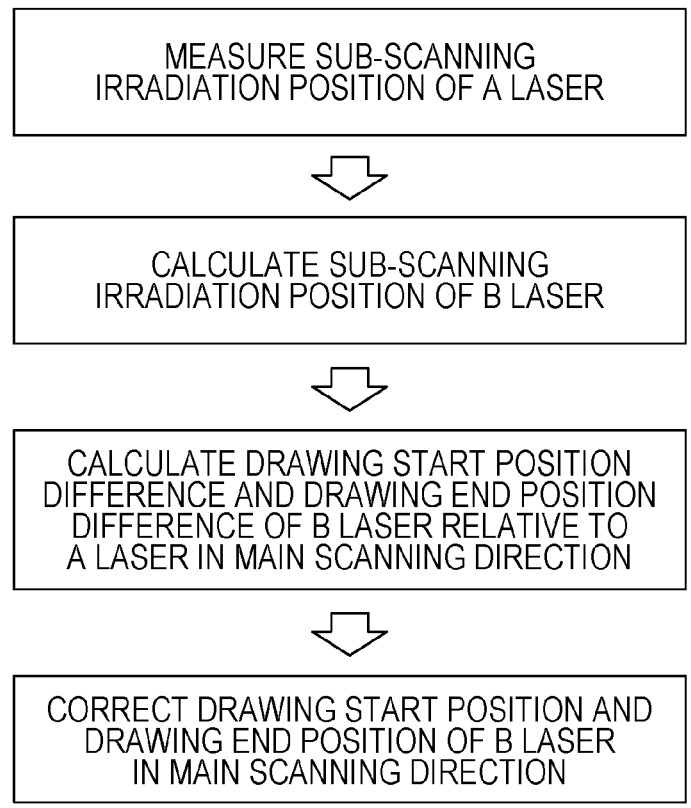
FIG. 1C is a flowchart of a drum oblique incidence jitter correction according to the first exemplary embodiment of the present invention.

Calculation of Drum Oblique Incidence Jitter (1) Measurement of the Irradiation Position of the a Laser in the Sub-Scanning Direction In the first exemplary embodiment, as illustrated in FIG. 1C, which illustrates a flowchart of a drum oblique incidence jitter correction, first, an irradiation position, in the sub-scanning direction, of the light beam from the A laser, serving as a single light beam among the light beams from the plurality of light emitters, is measured. A measuring unit for measuring the irradiation position in the sub-scanning direction may or may not be provided in advance in the optical scanning device. When the measuring unit for measuring the irradiation position in the sub-scanning direction is not provided in the optical scanning device, as illustrated in FIG. 1A, the device can be reduced in size, and the drum oblique incidence jitter is calculated by using a measuring unit serving as a tool, with an individual difference due to an arrangement error taken into consideration.

When a measuring unit 111 for measuring the irradiation position in the sub-scanning direction is provided in the optical scanning device, as illustrated in FIG. 1B, the drum oblique incidence jitter is calculated by using the measuring unit 111, with an individual difference due to an arrangement error taken into consideration. In the first exemplary embodiment, the surface to be scanned corresponds to a drum surface that extends in the main scanning direction. Meanwhile, a position corresponding to the surface to be scanned corresponds to a position within a plane that is perpendicular to the main scanning section as well as to the sub-scanning section (see FIG. 1B), and irradiation position information is calculated by the measuring unit 111 at the stated position corresponding to the surface to be scanned.

In this manner, in the first exemplary embodiment, a light emission timing control unit 113 corrects the drum oblique incidence jitter through a correction amount calculation unit 112, with an individual difference due to an arrangement error taken into consideration.

(2) Calculation of the Irradiation Position of the B Laser in the Sub-scanning Direction On the basis of the result obtained by measuring the irradiation position of the A laser in the sub-scanning direction, the irradiation position of the B laser in the sub-scanning direction is calculated in a manner described hereinafter, in which a pitch between the A laser and the B laser, in the sub-scanning direction, at the light source is denoted by p and the sub-scanning magnification of the optical systems is denoted by $\beta$.

(3) Calculation of a Drawing Start Position Difference and a Drawing End Position Difference of the B Laser Relative to the A Laser in the Main Scanning Direction Since only the drum oblique incidence jitter is to be corrected in the exemplary embodiment, the A laser, which serves as the reference light beam, is not subjected to any correction, and only the B laser, which serves as the general light beam, is subjected to a correction. A variation in the scanning length associated with the drum oblique incidence jitter is calculated as follows.

The scanning length $X_A$ of the A laser, serving as the reference light beam, and the scanning length $X_B$ of the B laser, serving as the general light beam, are expressed through the following expressions on the basis of optical path lengths $L_A$ and $L_B$ of the A and B lasers and a main scan divergence angle $\theta$.

$$X_A = L_A \tan\theta \qquad (1\text{-A})$$

$$X_B = L_B \tan\theta \qquad (1\text{-B})$$

In addition, the optical path lengths $L_A$ and $L_B$ are expressed through the following expressions on the basis of the optical path length $L_O$ from the center point (O1 in FIG. 1A) of the main scan divergence to the photosensitive drum surface 7 and the angles $\alpha$ and $\alpha+\Delta\alpha$ at which the A and B lasers are respectively incident on the photosensitive drum surface 7 (refer to FIG. 1A).

$$L_A = L_O + r\{1-\cos(\alpha)\} \qquad (2\text{-A})$$

$$L_B = L_O + r\{1-\cos(\alpha+\Delta\alpha)\} \qquad (2\text{-B})$$

Here, a distance d from an end point on the photosensitive drum in a normal direction thereof (point O2 in FIG. 1A) to the drum irradiation position of the A laser, serving as the reference light beam, in the sub-scanning direction is expressed through the expression below. In the expression, the angles at which the A and B lasers are respectively incident on the photosensitive surface 7 are denoted by $\alpha$ and $\alpha+\Delta\alpha$; the radium of the drum is denoted by r; the pitch between the A and B lasers, in the sub-scanning direction, at the light source is denoted by p; and the sub-scanning magnification of the optical systems is denoted by $\beta$.

$$d = r\sin(\alpha) \qquad (3\text{-A})$$

$$d + p\beta = r\sin(\alpha+\Delta\alpha) \qquad (3\text{-B})$$

On the basis of a difference between these two expressions, the following expressions are obtained.

$$p\beta = r\cos(\alpha)\sin(\Delta\alpha) \qquad (4)$$

$$\sin(\Delta\alpha) = p\beta/r\cos(\alpha) \qquad (5)$$

On the basis of the above, a relative scanning length difference $\Delta X_{B-A}$ of the scanning length $X_B$ of the B laser, serving as the general light beam, relative to the scanning length $X_A$ of the A laser, serving as the reference light beam, is expressed through the following expression.

$$\Delta X_{B-A} = X_B - X_A = p\beta d/(r^2-d^2)^{1/2} \qquad (6)$$

Thus, the drum oblique incidence jitter $\Delta$ of the B laser is calculated through the following expression.

$$\Delta = p\beta d/2(r^2-d^2)^{1/2} \qquad (7)$$

In other words, the drum oblique incidence jitter $\Delta$ of the B laser can be calculated if the four variables, namely, the pitch p between the A laser and the B laser in the sub-scanning direction at the light source, the sub-scanning magnification $\beta$, the distance d from the end point on the photosensitive drum to the irradiation position of the A laser, serving as the reference light beam, in the sub-scanning direction, and the radius r of the photosensitive drum are known.

On the other hand, since a drum oblique incidence jitter resulting from the design has been corrected in a conventional embodiment (Japanese Patent Laid-Open No. 2001-59945), a drum oblique incidence jitter amount calculated with the design values substituted for all of the variables in the above expression. A correction amount obtained in this case, or in other words, a drum oblique incidence jitter $\Delta(d_O)$ resulting from the design is expressed through the following expression, in which a design value $d_O$ of the irradiation position d in the sub-scanning direction is used.

$$\Delta(d_O) = p\beta d_O/2(r^2-d_O^2)^{1/2} \qquad (8)$$

In an actual device, however, there exists an optical or mechanical arrangement error, and in particular the irradiation position d in the sub-scanning direction varies easily from the design value. Thus, a drum oblique incidence jitter correction amount that is actually required differs from $\Delta(d_O)$. Therefore, in the first exemplary embodiment, the irradiation position d in the sub-scanning direction is actually measured, and an actual drum oblique incidence jitter $\Delta(d_M)$ is calculated by using the measured value $d_M$ of the irradiation position. Thus, a correction amount expressed through the following expression is used.

$$\Delta(d_M) = p\beta d_M/2(r^2-d_O^2)^{1/2} \qquad (9)$$

Through this, as compared with an existing technique in which the drum oblique incidence jitter correction amount has been calculated on the basis of the design value $d_O$ of the irradiation position in the sub-scanning direction, in the first exemplary embodiment, the correction amount can be calculated with high accuracy with an optical or mechanical arrangement error taken into consideration.

(4) Correction of the Drawing Start Position Difference and the Drawing End Position Difference of the B Laser in the Main Scanning Direction In the first exemplary embodiment, as in the method discussed in U.S. Pat. No. 6,459,520 (Japanese Patent Laid-Open No. 2000-89148) described in the related art, the drawing start position difference and the drawing end position difference between the A and B lasers in the main scanning direction are corrected by electrically controlling the light emission timing of the B laser. The correction method, however, is not particularly limited as long as the correction method does not depart from the spirit of the present invention.

Numerical Data

Hereinafter, effects of the first exemplary embodiment will be described with reference to schematic diagrams and specific numerical values. Table 1 illustrates parameters necessary for calculation in the first exemplary embodiment.

TABLE 1

| | |
|---|---|
| p | 90 μm |
| β | 8.074 |
| r | 15.0 mm |

Figure 3A:
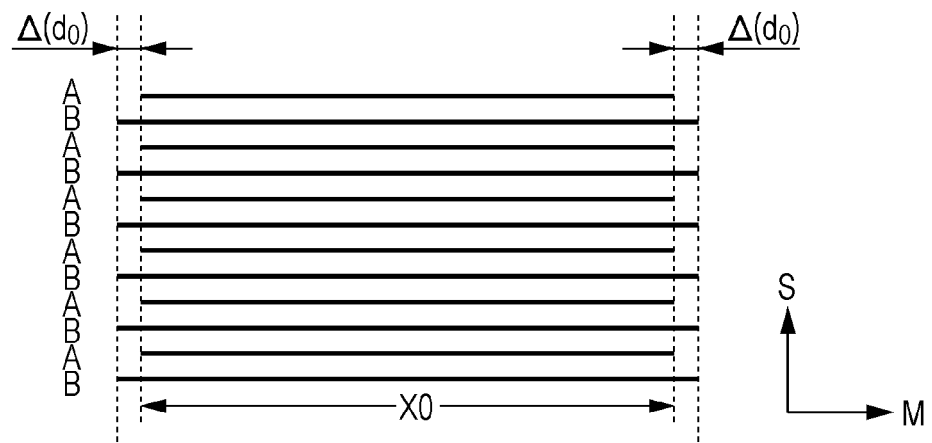
FIG. 3A is a schematic diagram of designed scanning lines.

Here, a designed drum oblique incidence jitter is calculated with the following numerical values. FIG. 3A illustrates scanning lines of the A and B lasers estimated by the design, in which the scanning length of the A laser takes a design value $X_O$ and the designed drum oblique incidence jitter generated in this case is $\Delta(d_O)$. By performing the following calculation using specific numerical values, the design value $d_O$ turns out to be $r \sin \alpha = 1.5$ mm, on the basis of the angle of incidence on the drum of $\alpha = 5.739°$ and the radius of curvature of the drum r. Thus, the designed drum oblique incidence jitter is calculated as $\Delta(d_O) = 36.5$ μm through Expression (8).

Figure 3B:
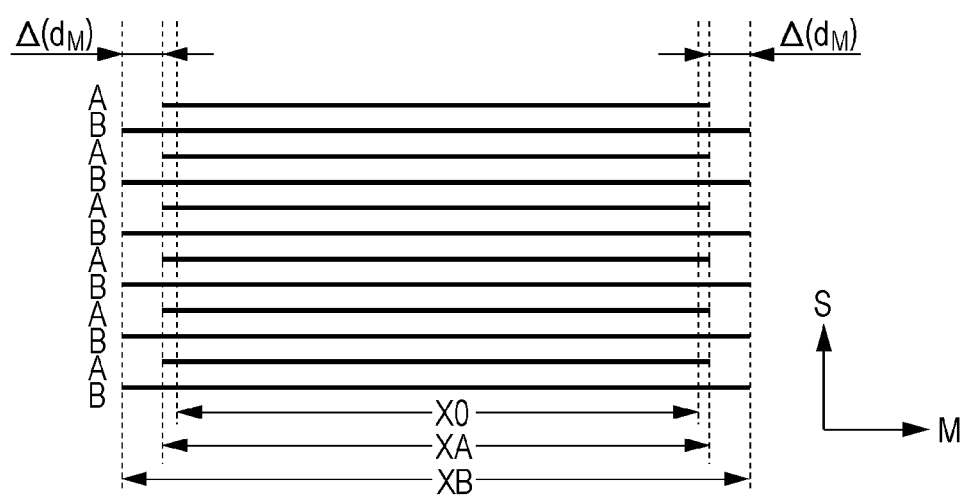
FIG. 3B is a schematic diagram of scanning lines in a case in which an individual difference due to an optical or mechanical arrangement error is present.

If the irradiation position d in the sub-scanning direction has deviated by +0.2 mm from the design value due to an optical or mechanical arrangement error in the actual device, the measured irradiation position turns out as $d_M = d_O + 0.2$ mm = 1.7 mm. FIG. 3B illustrates scanning lines of the A and B lasers obtained in this case. The scanning length $X_A$ of the A laser is greater than the design value $X_O$, and the actual drum oblique incidence jitter $\Delta(d_M)$ generated in this case is also greater than the designed drum oblique incidence jitter $\Delta(d_O)$. By performing the following calculation using specific numerical values, the actual drum oblique incidence jitter $\Delta(d_M)$ turns out to be 41.4 μm through Expression (9).

Figure 4A:
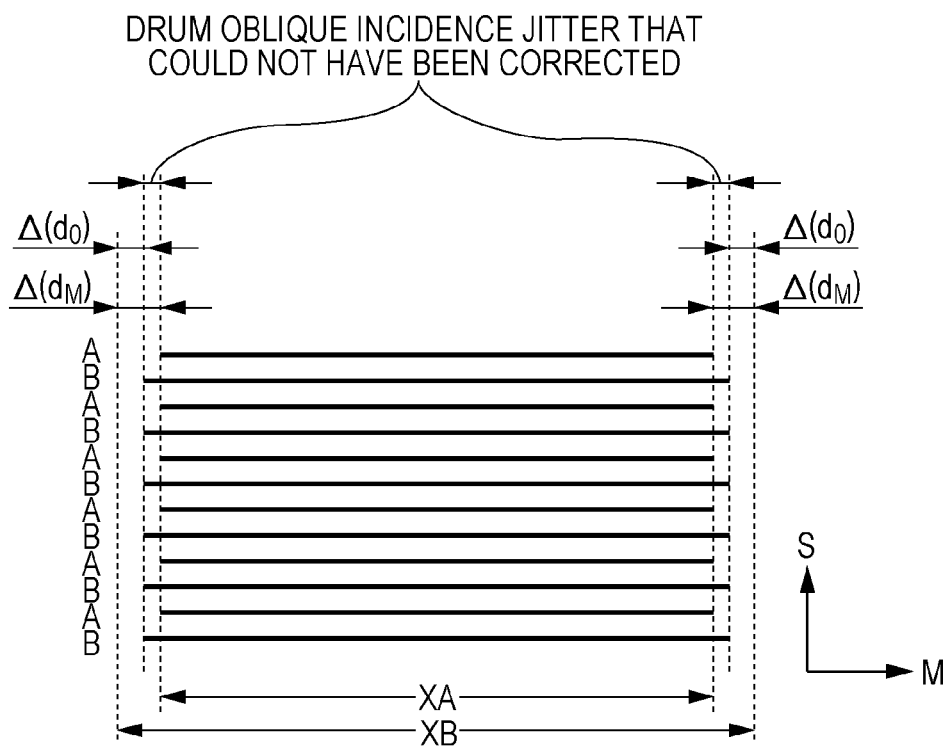
FIG. 4A is a schematic diagram of scanning lines obtained when a correction is made through an existing method.

FIG. 4A illustrates scanning lines of the A and B lasers to be obtained if the drum oblique incidence jitters of the drawing start position and the drawing end position in the main scanning direction are corrected by using an existing method. Here, the actual drum oblique incidence jitter $\Delta(d_M)$ is corrected by using the designed drum oblique incidence jitter $\Delta(d_O)$ as a correction amount. Thus, differences arise between the drawing start positions of the A laser and B lasers and between the drawing end positions of the A laser and B lasers in the main scanning direction by an amount corresponding to a drum oblique incidence jitter that could not have been corrected.

By performing the following calculation using specific numerical values, the actual drum oblique incidence jitter $\Delta(d_M)$–the designed drum oblique incidence jitter correction amount $\Delta(d_O) = 41.4$ μm–36.5 μm = 4.9 μm, which corresponds to the amount of drum oblique incidence jitter that could not have been corrected.

Figure 4B:
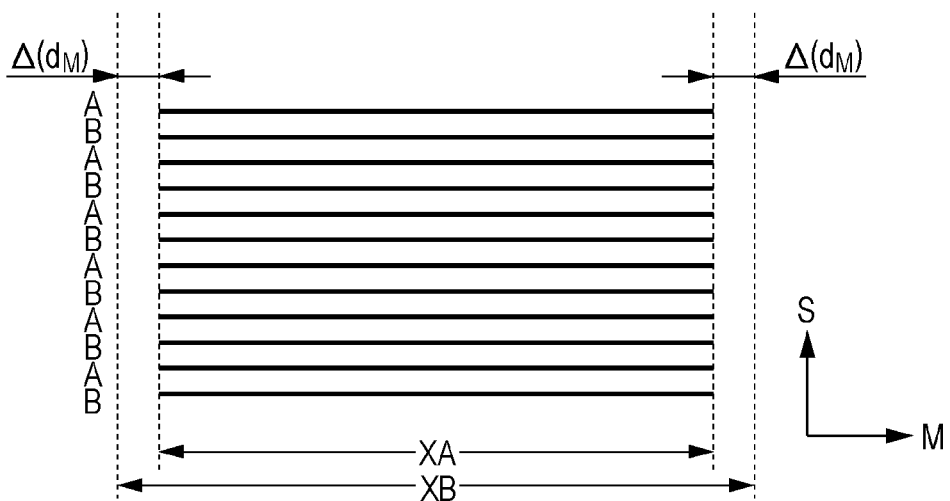
FIG. 4B is a schematic diagram of scanning lines obtained when a correction is made through a method according to the first exemplary embodiment of the present invention.

On the other hand, in the first exemplary embodiment, the drum oblique incidence jitters of the drawing start position and the drawing end position in the main scanning direction are corrected through the method described above. FIG. 4B illustrates scanning lines of the A and B lasers obtained in this case. In the first exemplary embodiment, the actual drum oblique incidence jitter is corrected, and thus the drawing start position difference and the drawing end position difference are both 0 in the main scanning direction. As a result, the scanning length of the B laser changes from $X_B$ to $X_A$, becoming equal to the scanning length of the A laser.

By performing the following calculation using specific numerical values, the actual drum oblique incidence jitter $\Delta(d_M)$–the actual drum oblique incidence jitter correction amount $\Delta(d_M) = 41.4$ μm–41.4 μm = 0.0 μm, and thus the drum oblique incidence jitter can be corrected to a sufficient degree. In other words, while FIG. 4A illustrates a drum oblique incidence jitter of 4.9 μm that could not have been corrected, FIG. 4B does not illustrate drum oblique incidence jitter that could not have been corrected. In this manner, in the first exemplary embodiment, a deviation in the imaging position of the B laser from that of the A laser in the main scanning direction is reduced by 4.9 μm, leading to an improvement in print precision.

Reason for Setting Design Values in Variables Other than d

Here, in the method according to the first exemplary embodiment, the correction amount is calculated with the design values substituted for the variables used to calculate the correction amount, except for the irradiation position d in the sub-scanning direction. The reason for the above will be described, hereinafter. The pitch p between the light emitters A and B in the sub-scanning direction greatly influences the print pitch in the sub-scanning direction and is thus typically adjusted exactly. Therefore, an error between the actual value and the design value of the pitch p in the sub-scanning direction is small. In addition, the sub-scanning magnification β of the optical systems has a sufficiently small value from the beginning in a typical optical scanning device and is thus not sensitive to an optical or mechanical arrangement error. Therefore, the error between the actual value and the design value of the sub-scanning magnification β is small.

Lastly, with regard to the radius r of the drum, the drum itself is a component that cooperates with other mechanical components and is thus manufactured with high precision. Therefore, an error between the actual value and the design value of the radius r of the drum is small. On the basis of the above, the drum oblique incidence jitter correction amount $\Delta(d_M)$ can be calculated with high accuracy even when the design values are substituted for the variables other than the measured value $d_M$ of the irradiation position in the sub-scanning direction in Expression (9).

Allowance

Here, typically, it is desirable that the drawing start position difference or the drawing end position difference of each of the light beams in the main scanning direction be equal to or less than ¼ dpi. Specific values are indicated below.

when the resolution in the main scanning direction is 600 dpi: ¼×25.4 [mm/inch]/600 [dpi]=10.6 μm or less when the resolution in the main scanning direction is 1200 dpi: ¼×25.4 [mm/inch]/1200 [dpi]=5.3 μm or less As long as these conditions are satisfied, the drawing start position difference and the drawing end position difference in the main scanning direction are noticeable and are thus considered not to be an issue. In the first exemplary embodiment, the assumption is that the resolution in the main scanning direction is 600 dpi, and the correction is made so as to bring the drawing start position difference and the drawing end position difference to 0, and thus the above condition is satisfied.

Note that there is another factor that causes an imaging position deviation in the main scanning direction to occur, aside from the drum oblique incidence jitter, and thus the final imaging position deviation correction amount in the main scanning direction may be a correction amount with these factors taken into consideration. Described in the first exemplary embodiment is merely an imaging position deviation correction amount in the main scanning direction for correcting the drum oblique incidence jitter, which is not necessarily equal to the final correction amount.

Correction on One Side

In addition, although both the drawing start position and the drawing end position in the main scanning direction are corrected in the first exemplary embodiment, only the drawing start position may be corrected. That is because, in a typical document, for example, writing start positions may be flush with one another but the writing end positions may not be flush with one another depending on the text length. In other words, the first exemplary embodiment can also be applied when only the drawing start position is corrected, without correcting both the drawing start position and the drawing end position.

Recapitulation of First Exemplary Embodiment

As described thus far, in the first exemplary embodiment, the principal rays of the A and B lasers, which are the entire light beams, are incident on the photosensitive drum surface 7 at an angle of incidence a of 5.739° or greater along the sub-scanning section. The irradiation position $d_M$ of the A laser, in the sub-scanning direction, at a position corresponding to the photosensitive drum surface 7 is then calculated. In other words, the irradiation position pitch, in the sub-scanning direction, between at least a pair of light beams among the plurality of light beams at a position corresponding to the surface to be scanned is measured. On the basis of the measured value $d_M$ of the irradiation position obtained through the above measurement, the drum oblique incidence jitter correction amount for the B laser, serving as the general light beam, is calculated, and the drawing start position difference of the B laser in the main scanning direction is corrected by using the calculated correction amount.

Through this configuration, unlike the existing method in which the drum oblique incidence jitter correction amount is calculated from the design values of the irradiation position in the sub-scanning direction, the drum oblique incidence jitter correction amount can be calculated with an individual difference due to an optical or mechanical arrangement error taken into consideration. The drawing start position difference in the main scanning direction is then corrected by using the calculated correction amount, and thus the print precision improves.

Various Characteristics of Optical System

Table 2 and Table 3 illustrate various characteristic values of the optical scanning device according to the first exemplary embodiment.

TABLE 2

| USED WAVELENGTH | λ (nm) | 780 |
|---|---|---|
| POLYGON SURFACE TO FIRST SURFACE OF FIRST fθ LENS | d1 | 41.78 |
| THICKNESS OF FIRST fθ LENS | d2 | 9.5 |
| SECOND SURFACE OF FIRST fθ LENS TO FIRST SURFACE OF SECOND fθ LENS | d3 | 7.13 |
| THICKNESS OF SECOND fθ LENS | d4 | 8.6 |
| SECOND SURFACE OF SECOND fθ LENS TO SURFACE TO BE SCANNED | d5 | 189.74 |
| REFRACTIVE INDEX OF FIRST fθ LENS | n_lens 1 | 1.52420 |
| REFRACTIVE INDEX OF SECOND fθ LENS | n_lens 2 | 1.52420 |
| POSTERIOR PRINCIPAL PLANE OF fθ LENS TO NATURAL CONVERGENT POINT | Sd | 1176.401 |
| POSTERIOR PRINCIPAL PLANE OF fθ LENS TO IMAGING POSITION | Sk | 204.695 |
| FOCAL DISTANCE OF fθ LENS | f | 251.051 |
| LIGHT EMISSION PITCH IN SUB-SCANNING DIRECTION | p | 0.090 |
| NUMBER OF LIGHT EMITTING POINTS | N | 2 |
| ANGLE AT WHICH REFERENCE LIGHT BEAM IS INCIDENT ON DRUM IN SUB-SCANNING DIRECTION | α | 5.739 |
| ANGLE OF INCIDENCE ON POLYGON IN MAIN SCANNING DIRECTION | γ | 60 |
| MAXIMUM ANGLE OF EMISSION FROM POLYGON | β | 41.347 |
| POLYGON RADIUS | φ | 50 (HEXAHEDRON) |

TABLE 3

SHAPES OF fθ LENSES

| FIRST SURFACE | | SECOND SURFACE | |
|---|---|---|---|
| FIRST fθ LENS | | | |
| R | −67.970 | R | −49.663 |
| k | −5.593E−01 | ku | 3.760E−02 |
| B4 | 1.106E−06 | B4u | 1.207E−06 |
| B6 | 6.661E−11 | B6u | 8.041E−10 |
| B8 | 0.000E+00 | B8u | −3.000E−13 |
| B10 | 0.000E+00 | B10u | 1.631E−16 |
| | | kl | 2.867E−02 |
| | | B4l | 1.156E−06 |
| | | B6l | 8.456E−10 |
| | | B8l | −3.165E−13 |
| | | B10l | 1.631E−16 |
| r | −29.500 | r | −22.884 |
| D2 | 0.000E+00 | D2u | −2.057E−04 |
| D4 | 0.000E+00 | D4u | 6.197E−08 |
| D6 | 0.000E+00 | D6u | 0.000E+00 |
| D8 | 0.000E+00 | D8u | 0.000E+00 |
| D10 | 0.000E+00 | D10u | 0.000E+00 |
| | | D2l | −1.810E−04 |
| | | D4l | 5.556E−08 |
| | | D6l | 0.000E+00 |
| | | D8l | 0.000E+00 |
| | | D10l | 0.000E+00 |
| SECOND fθ LENS | | | |
| R | 46.718 | R | 45.398 |
| k | −9.145E+00 | k | −9.476E+00 |
| B4 | −5.632E−07 | B4 | −1.035E−06 |
| B6 | −8.574E−11 | B6 | 9.461E−11 |
| B8 | 3.524E−14 | B8 | −1.308E−14 |
| B10 | −2.323E−18 | B10 | 1.969E−18 |
| r | −68.000 | r | −25.559 |
| D2 | 1.874E−03 | D2 | 9.964E−04 |
| D4 | 1.909E−06 | D4 | −4.929E−07 |
| D6 | 0.000E+00 | D6 | 1.260E−10 |
| D8 | 0.000E+00 | D8 | −1.582E−14 |
| D10 | 0.000E+00 | D10 | 7.640E−19 |

In the first exemplary embodiment, the aspherical shape, along the main scanning section, of the lenses included in the fθ lens system 6 is expressed through Expression (10) below. Here, with the intersection of each lens surface and the optical axis serving as an origin, the optical axis direction corresponds to an X axis; an axis that lies along the main scanning section and is orthogonal to the optical axis corresponds to a Y axis; and an axis that lies along the sub-scanning section and is orthogonal to the optical axis corresponds to a Z axis.

$$x = \frac{y^2/R}{1+(1-(1+k)(y/R^2)^{1/2}} + B_4 y^{4+} B_6 y^6 + B_8 y^8 + B_{10} y^{10} \quad (10)$$

Here, R represents a radius of curvature, and k, B4, B6, B8, and B10 each represent an aspherical coefficient. In a case in which each of the stated coefficients differs depending on the sign of the value of y, ku and B4u to B10u, each with an appended letter u, are used as the coefficients when the value of y is positive, and kl and B4i to B10l, each with an appended letter l, are used as the coefficients when the value of y is negative.

Meanwhile, the lens has such a shape, along the sub-scanning section, that the radius of curvature r' at a position where the lens surface coordinate is y in the main scanning direction is expressed through Expression (11) below.

$$r'=r(1+D2y2+D4y4+D6y6+D8y8+D10y10) \quad (11)$$

Here, r represents the radius of curvature on the optical axis, and D2 to D10 each represent a coefficient. In a case in which each of the coefficients differs depending on the sign of the value of y, the radius of curvature r' is calculated by using D2u to D10u, each with an appended letter u, as the coefficients when the value of y is positive. Meanwhile, the radius of curvature r' is calculated by using D21 to D10l, each with an appended letter l, as the coefficients when the value of y is negative.

Method for Manufacturing Optical Scanning Device

The first exemplary embodiment can also be considered as a method for manufacturing an optical scanning device in which light beams, serving as incident light beams, from a plurality of light emitters that are spaced apart in the sub-scanning direction are made to be incident on a surface to be scanned in a direction oblique to the normal of the surface, and the method includes the following steps. Specifically, the stated method includes a first step in which irradiation position information, in the sub-scanning direction, of at least one light beam among the plurality of light beams at a position corresponding to the surface to be scanned is measured. The stated method further includes a second step in which a jitter of at least one of the plurality of light beams in the main scanning direction is corrected on the basis of the irradiation position information.

In implementing such a method for manufacturing the optical scanning device, a measuring unit for measuring the irradiation position in the sub-scanning direction may not be provided in advance in the optical scanning device and may be used as a tool when assembling the device, and thus the device can be reduced in size.

Second Exemplary Embodiment

In the first exemplary embodiment, the drum oblique incidence jitter resulting from a relative scanning length difference $\Delta X_{B-A}$ of the scanning length $X_B$ of the B laser, serving as the general light beam, relative to the scanning length $X_A$ of the A laser, serving as the reference light beam, has been corrected. The "drum oblique incidence jitter" defined here corresponds to an imaging position deviation of the B laser relative to the A laser in the main scanning direction at the time of measurement.

In the meantime, in a second exemplary embodiment, the imaging position of the A laser, serving as the reference light beam, in the main scanning direction is first corrected so that the scanning length $X_A$ of the A laser matches the design value $X_O$ (at least one of the drawing start position and the drawing end position in the main scanning direction is made to match the design value). Thereafter, the drum oblique incidence jitter resulting from the relative scanning length difference $\Delta X_{B-A}$ of the scanning length $X_B$ of the B laser, serving as the general light beam, relative to the scanning length $X_A$ of the A laser, serving as the reference light beam, is corrected. Since the scanning length $X_A$ of the A laser is equal to the design value $X_O$, the relative scanning length difference $\Delta X_{B-A}$ in this case is equal to a scanning length difference $\Delta X_{B-o}$ used when the imaging position in the main scanning direction is corrected so that the scanning length $X_B$ of the B laser matches the design value $X_O$ for the A laser.

In other words, correcting the drum oblique incidence jitter of the B laser resulting from the relative scanning length difference $\Delta X_{B-A}$ is identical to correcting the drum oblique incidence jitter resulting from the scanning length difference $\Delta X_{B-O}$. This drum oblique incidence jitter is referred to as a "second drum oblique incidence jitter" to distinguish from the "drum oblique incidence jitter" meaning the relative deviation described thus far.

Hereinafter, a method for calculating a correction amount for the second drum oblique incidence jitter will be described. First, an imaging position correction amount for the scanning length $X_A$ of the A laser, serving as the reference light beam, in the main scanning direction will be described. The irradiation position in the sub-scanning direction is denoted by d, and a scanning length of the A laser with the measured value $d_M$ of the irradiation position in the sub-scanning direction taken into consideration corresponds to a measured scanning length $X_A(d_M)$. Similarly, a scanning length of the A laser with the design value $d_O$ taken into consideration corresponds to a designed scanning length $X_A(d_O)$. The scanning length difference $\Delta X_{A-O}$ in this case is expressed through the following expression, in which $d_M-d_O$ is substituted for pβ and $d_O$ is substituted for d in Expression (6).

$$\Delta X_{A-O}=X_A(d_M)-X_A(d_O)=d_O(d_M-d_O)/(r^2-d_O^2)^{1/2} \quad (12)$$

Through this, a correction amount $\Delta_{A-O}$ for the imaging position of the A laser in the main scanning direction is expressed through the following expression.

$$\Delta_{A-O}=d_O(d_M-d_O)/2(r^2-d_O^2)^{1/2} \quad (13)$$

By correcting the imaging position of the A laser in the main scanning direction by an amount corresponding the calculated correction amount, the imaging position of the A laser in the main scanning direction matches the design value.

Subsequently, the correction amount for the second drum oblique incidence jitter of the B laser, serving as the general light beam, will be described. With regard to the scanning length difference $\Delta X_{B-O}$ of the B laser, in addition to the relative scanning length difference $\Delta X_{B-A}$ considered in the first exemplary embodiment, only the scanning length difference $\Delta X_{A-O}$ of the A laser needs to be considered, and thus the scanning length difference $\Delta X_{B-O}$ is expressed through the following expression.

$$\Delta X_{B-O}=\Delta X_{B-A}+\Delta X_{A-O}=pβd_M/(r^2-d_A^2)^{1/2}+d_O(d_M-d_O)/(r^2-d_O^2)^{1/2} \quad (14)$$

Through this, a correction amount $\Delta_{B-O}$ for the second drum oblique incidence jitter of the B laser is expressed through the following expression.

$$\Delta_{B-O} = \Delta X_{B-O}/2 = \Delta(d_A) + \Delta X_{A-O} \quad (15)$$

By correcting the imaging position of the B laser in the main scanning direction by an amount corresponding to the calculated correction amount, the imaging position of the B laser in the main scanning direction matches the design value for the A laser, and, at the same time, the imaging position deviation, in the main scanning direction, from the A laser is corrected.

In the second exemplary embodiment, the imaging positions of the A and B lasers in the main scanning direction are corrected so as to match the design value, and the irradiation position of the reference light beam in the sub-scanning direction is measured by a measuring mechanism provided in the optical scanning device. Through this, the second drum oblique incidence jitter can be corrected with not only an initial value but also an environmental variation of an individual difference due to an arrangement error taken into consideration.

Correction Flow

Figure 5:
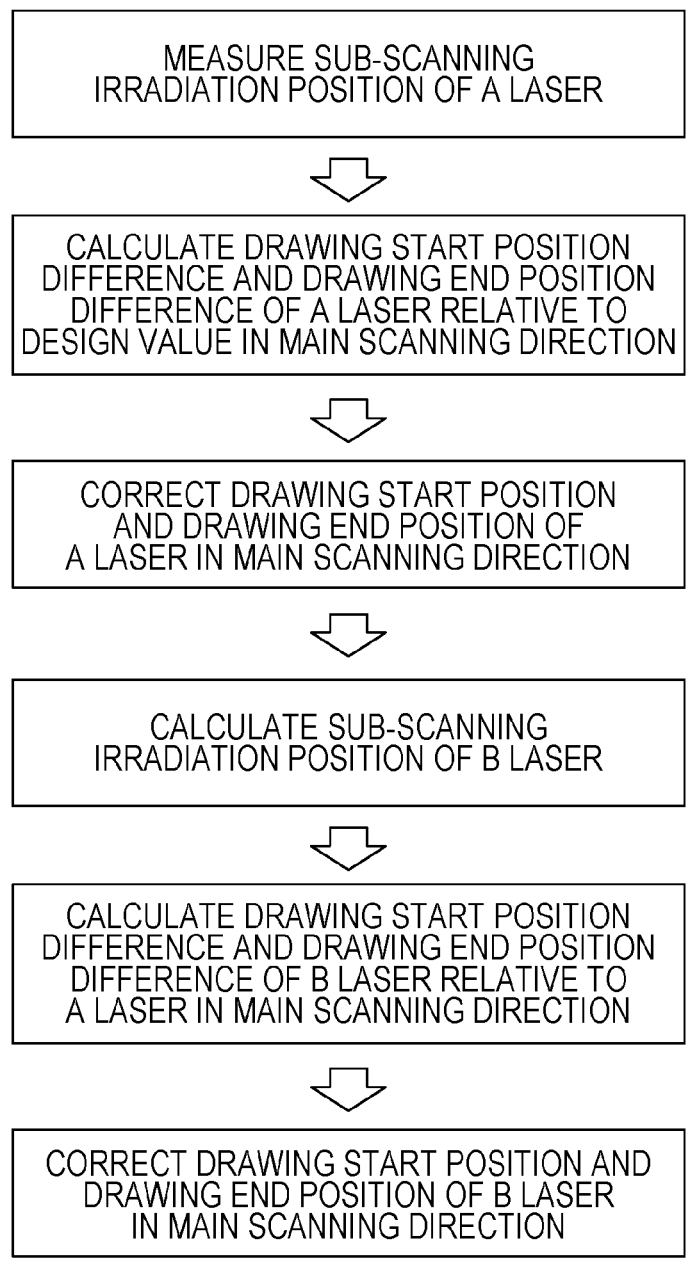
FIG. 5 is a flowchart of a drum oblique incidence jitter correction according a second exemplary embodiment of the present invention.

FIG. 5 summaries the correction flow in the second exemplary embodiment. The correction flow of the second exemplary embodiment includes three steps pertaining to the A laser and four steps pertaining to the B laser.

(a) Correction Flow for the a Laser (1) The irradiation position of the A laser in the sub-scanning direction is measured.

(2) The drawing start position difference and the drawing end position difference of the A laser, in the main scanning direction, relative to the design values for the A laser are calculated on the basis of the irradiation position of the A laser in the sub-scanning direction.

(3) The drawing start position and the drawing end position of the A laser are corrected by using the results obtained through the above calculation as correction amounts.

(b) Correction Flow for the B Laser (1) The irradiation position of the A laser in the sub-scanning direction is measured.

(2) The irradiation position of the B laser in the sub-scanning direction is calculated on the basis of the obtained irradiation position of the A laser in the sub-scanning direction.

(3) The drawing start position difference and the drawing end position difference (second drum oblique incidence jitters) of the B laser in the main scanning direction relative to those of the A laser are calculated on the basis of the calculated irradiation position of the B laser in the sub-scanning direction.

(4) The drawing start position and the drawing end position of the B laser are corrected by using the calculated second drum oblique incidence jitters as correction amounts.

Here, the correction flow in the second exemplary embodiment is merely an example of an exemplary embodiment of the present invention, and an exemplary embodiment is not limited to the described correction flow.

Numerical Data

Figure 6A:
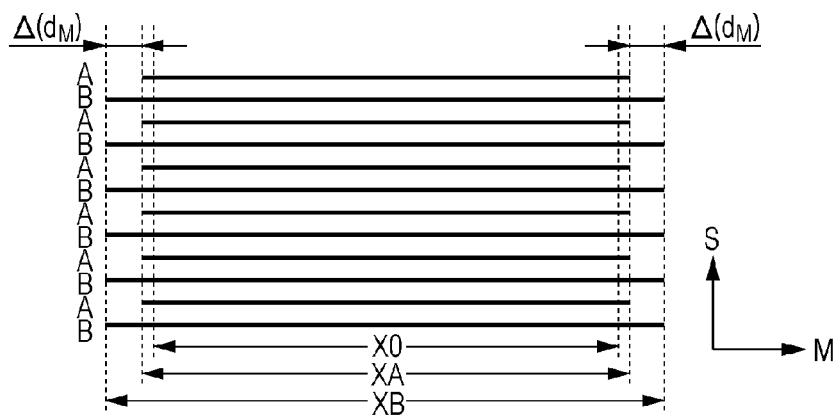
FIG. 6A is a schematic diagram of scanning lines in a case in which an individual difference due to an optical or mechanical arrangement error is present in the second exemplary embodiment.

Hereinafter, effects of the second exemplary embodiment will be described using schematic diagrams and specific numerical values. Parameters necessary for calculation in the second exemplary embodiment are the same as those illustrated in Table 1. If the irradiation position d deviates from the design value $d_O$ by +0.2 mm, as in the first exemplary embodiment, due to an optical or mechanical arrangement error in the actual device, the measured irradiation position turns out as $d_M = d_O + 0.2$ mm = 1.7 mm. FIG. 6A illustrates scanning lines of the A and B lasers obtained in this case. The illustrated case is similar to that illustrated in FIG. 3B.

Figure 6B:
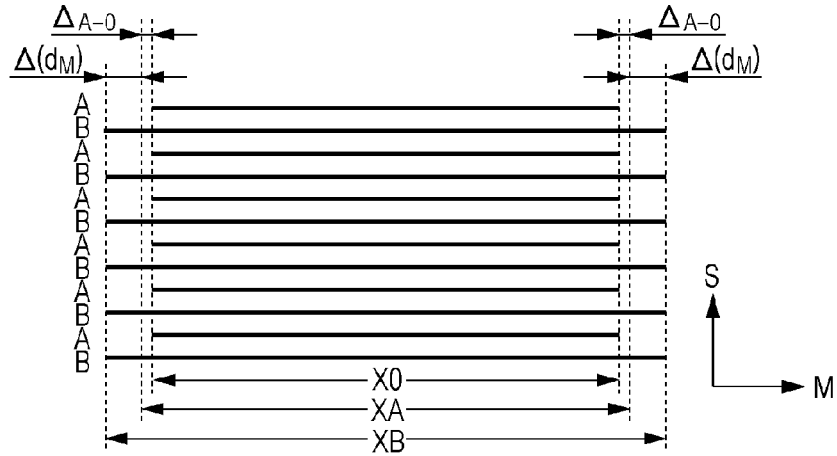
FIG. 6B is a schematic diagram of scanning lines obtained when a correction is made so as to bring an A laser to match a design value.

In the second exemplary embodiment, the imaging position of the A laser, serving as the reference light beam, in the main scanning direction is corrected to match the design value by using the correction amount $\Delta_{A-O}$. By performing the following calculation using specific numerical values, the correction amount $\Delta_{A-O}$ for the imaging position in the main scanning direction turns out to be 10.1 μm through Expression (13). FIG. 6B illustrates scanning lines of the A and B lasers obtained after this correction. The scanning length of the A laser has been corrected from $X_A$ to $X_O$, and thus the drawing start position and the drawing end position of the A laser in the main scanning direction match the design values.

Figure 6C:
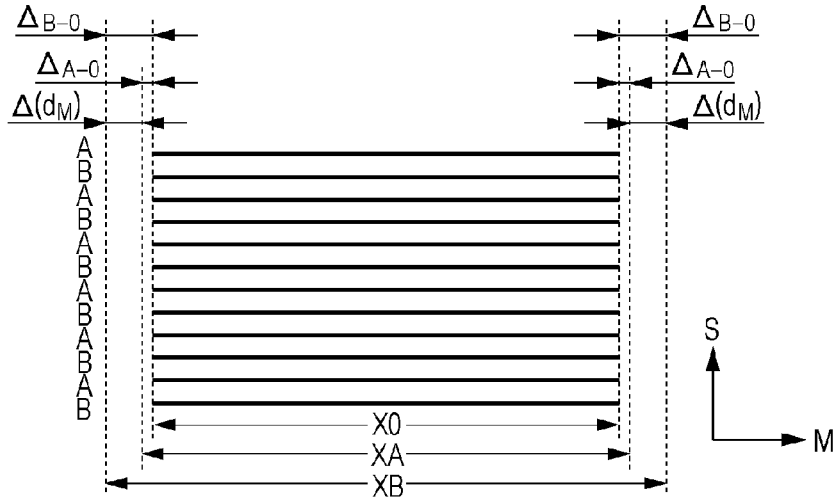
FIG. 6C is a schematic diagram of scanning lines obtained when a correction is made so as to bring a B laser to match the design value.

Subsequently, the second drum oblique incidence jitter $\Delta_{B-O}$ present at this point is corrected, and the imaging position of the B laser, serving as the general light beam, in the main scanning direction is also corrected to match the design value for the A laser. By performing the following calculation using specific numerical values, the second drum oblique incidence jitter correction amount $\Delta_{B-O}$ turns out to be $\Delta(d_M) + \Delta_{A-O} = 41.4$ μm + 10.1 μm = 51.5 μm through Expression (15). FIG. 6C illustrates scanning lines of the A and B lasers obtained after this correction. The scanning length of the B laser is corrected from $X_B$ to $X_O$, and thus the drawing start position and the drawing end position of the B laser in the main scanning direction match the design values for the A laser.

Since the drawing start positions and the drawing end positions of the A and B lasers both match the design values for the A laser, relative differences between the drawing start positions of the A and B lasers and between the drawing end positions of the A and B lasers become 0. Thus, an improving effect of the second exemplary embodiment relative to the correction method discussed in U.S. Pat. No. 6,459,520 (Japanese Patent Laid-Open No. 2001-59945) described as the conventional embodiment turns out to be 4.9 μm, as in the first exemplary embodiment. The second exemplary embodiment, however, differs from the first exemplary embodiment in that the imaging positions of the A and B lasers in the main scanning direction both match the design value for the A laser.

Correction Method

Here, as in the first exemplary embodiment, the method for correcting the imaging positions of the A and B lasers in the main scanning direction is not particularly limited as long as the method utilizes the spirit of the present invention.

Note that, as also described in the first exemplary embodiment, there is another factor that causes an imaging position to deviate from the design value in the main scanning direction, aside from the light beams being incident obliquely on the drum, and thus the final imaging position deviation correction amount in the main scanning direction may be a correction amount with these factors taken into consideration. Discussed in the second exemplary embodiment is merely the correction amount for correcting a deviation, in the main scanning direction, from the design value of the imaging position resulting from the light beams being obliquely incident on the drum, which is not necessarily equal to the final correction amount.

Measurement of Irradiation Position During Assembly Process

The second exemplary embodiment also differs from the first exemplary embodiment in terms of the method for measuring the irradiation position in the sub-scanning direction, which will now be described. In the second exemplary embodiment, the irradiation position of the A laser, serving as the reference light beam, in the sub-scanning direction is measured with a measuring unit provided in the optical scanning device. FIG. 1B illustrates a main scanning section and a sub-scanning section of the specific configuration of the measuring unit of the second exemplary embodiment. The optical scanning device is provided with a mirror 10 for measuring the irradiation position in the sub-scanning direction, and the mirror 10 reflects some of the scanning light beam which is not used for drawing. The scanning light beam that has been reflected by the mirror 10 is received by the irradiation position measuring unit 111, in which the irradiation position in the sub-scanning direction is measured.

Here, to facilitate understanding, a pseudo-photosensitive drum 7', which is obtained if the photosensitive drum 7 is inverted across the mirror 10 serving as a reference, is also illustrated. It is understood from FIG. 1B that the irradiation position in the sub-scanning direction can be measured with the use of the mirror 10 and the irradiation position measuring unit 111.

The correction amount calculation unit 112 calculates the correction amount from the irradiation position in the sub-scanning direction measured by the irradiation position measuring unit 111, and the light emission timing control unit 113, serving as a correction unit, controls the light emission timing by using the calculated correction amount. Prior to drawing, the irradiation position of the A laser in the sub-scanning direction is measured by using the irradiation position measuring unit 111, and the imaging positions of the A laser and the B laser in the main scanning direction are corrected by using the correction amount calculated from the measured value $d_M$ of the irradiation position of the A laser.

Through this configuration, the irradiation position of the reference light beam in the sub-scanning direction is measured by the measuring unit provided in the optical scanning device, and thus the imaging position deviation in the main scanning direction can be corrected with not only an initial value but also an environmental variation of an individual difference due to an arrangement error taken into consideration.

Method for Manufacturing Optical Scanning Device

The second exemplary embodiment can also be considered as a method for manufacturing an optical scanning device in which light beams, serving as incident light beams, from a plurality of light emitters that are spaced apart in the sub-scanning direction are made to be incident on a surface to be scanned in a direction oblique to the normal of the surface, and the method includes the following steps. Specifically, the stated method includes a first step in which irradiation position information, in the sub-scanning direction, of at least one light beam among the plurality of light beams at a position corresponding to the surface to be scanned is measured. The stated method further includes a second step in which a jitter of the plurality of light beams in the main scanning direction is corrected on the basis of the irradiation position information.

In implementing such a method for manufacturing the optical scanning device, a measuring unit for measuring the irradiation position in the sub-scanning direction may not be provided in advance in the optical scanning device and may be used as a tool when assembling the device, and thus the device can be reduced in size.

First Modification

In the exemplary embodiments described above, while the surface to be scanned corresponds to a drum surface that extends in the main scanning direction, and a position corresponding to the surface to be scanned corresponds to a position that lies on a plane perpendicular to the main scanning section and also to the sub-scanning section (see FIG. 1B), and the irradiation position information has been measured at the position corresponding to the surface to be scanned. An exemplary embodiment of the present invention, however, is not limited thereto, and the irradiation position information may be measured at a position offset, in the optical axis direction, from the position corresponding to the surface to be scanned, and the irradiation position information at the position corresponding to the surface to be scanned may be obtained through a conversion.

Second Modification

In the exemplary embodiments described above, the irradiation position of only the A laser in the sub-scanning direction has been measured, and the correction amount has been calculated accordingly. Alternatively, the irradiation position of only the B laser in the sub-scanning direction may be measured, and the correction amount may be calculated accordingly. As another alternative, the irradiation positions of the A and B lasers in the sub-scanning direction may be measured. In other words, the irradiation position information may be measured for all or some of the light beams among the plurality of light beams deflected by the deflector. The case in which the irradiation position of only the A laser in the sub-scanning direction is measured, however, is advantageous in that a person-hour can be reduced as compared to the case in which the irradiation positions of the A and B lasers in the sub-scanning direction are measured.

Third Modification

Although both the drawing start position difference and the drawing end position difference in the main scanning direction have been corrected in the exemplary embodiments described above, at least one of the drawing start position difference and the drawing end position difference in the main scanning direction may be corrected.

Fourth Modification

Although the two light emitters A and B are provided in the exemplary embodiments described above for simplifying the description, the number of light emitters is not limited to two in the present invention. When a larger number of light emitters, such as three or more light emitters, are provided, a more advantageous effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-099041 filed May 9, 2013, which is hereby incorporated by reference herein in its entirety.

What is claimed is:

1. An optical scanning device, comprising:
  a deflector configured to deflect, in a main scanning direction, a plurality of light beams emitted from a plurality of light emitters, the light emitters being mutually spaced apart in a sub-scanning direction;
  an incident optical system configured to steer the plurality of light beams emitted from the plurality of light emitters so as to be incident on the same deflecting surface of the deflector;
  an imaging optical system configured to steer the plurality of light beams deflected by the deflector so as to be obliquely incident on the same surface to be scanned and to form images of the plurality of light emitters on the surface to be scanned; and
  a correction unit configured to correct a jitter of at least one of the plurality of light beams in the main scanning direction on the basis of irradiation position information, in the sub-scanning direction, of at least one light beam among the plurality of light beams at a position corresponding to the surface to be scanned.

2. The optical scanning device according to claim 1, wherein the surface to be scanned corresponds to a drum surface extending in the main scanning direction, and wherein the position corresponding to the surface to be scanned is a position that lies on a plane perpendicular to a main scanning section and to a sub-scanning section.

3. The optical scanning device according to claim 1, wherein the irradiation position information corresponds to one of information measured at the position corresponding to the surface to be scanned and information obtained by converting information measured at a position that is different from the position corresponding to the surface to be scanned to the position corresponding to the surface to be scanned.

4. The optical scanning device according to claim 1, further comprising:
a measuring unit configured to measure the irradiation position information of at least one light beam among the plurality of light beams deflected by the deflector; and
a calculation unit configured to calculate the irradiation position information of another light beam on the basis of the irradiation position information measured by the measuring unit.

5. The optical scanning device according to claim 4, wherein the measuring unit measures the irradiation position information for all or some of the plurality of light beams among the plurality of light beams deflected by the deflector.

6. The optical scanning device according to claim 1, wherein the correction unit corrects at least one of a drawing start position difference and a drawing end position difference of the at least one of the plurality of light beams in the main scanning direction.

7. The optical scanning device according to claim 6, wherein the correction unit corrects at least one of the drawing start position difference and the drawing end position difference in the main scanning direction so as to equal to or smaller than ¼ dpi.

8. The optical scanning device according to claim 1, wherein the correction unit corrects at least one of a drawing start position difference and a drawing end position difference in the main scanning direction so as to match a design value.

9. The optical scanning device according to claim 1, wherein the correction unit corrects the jitter by adjusting a light emission timing of at least one of the light emitters.

10. The optical scanning device according to claim 1, further comprising: a measuring unit configured to measure the irradiation position information.

11. An image forming apparatus, comprising:
an optical scanning device including:
a deflector configured to deflect, in a main scanning direction, a plurality of light beams emitted from a plurality of light emitters, the light emitters being mutually spaced apart in a sub-scanning direction,
an incident optical system configured to steer the plurality of light beams emitted from the plurality of light emitters so as to be incident on the same deflecting surface of the deflector,
an imaging optical system configured to steer the plurality of light beam deflected by the deflector so as to be obliquely incident on the same surface to be scanned and to form images of the plurality of light emitters on the surface to be scanned, and
a correction unit configured to correct a jitter of at least one of the plurality of light beams in the main scanning direction on the basis of irradiation position information, in the sub-scanning direction, of at least one light beam among the plurality of light beams at a position corresponding to the surface to be scanned; and
a developing unit configured to develop, into a toner image, an electrostatic latent image formed on a photosensitive surface on the surface to be scanned by the plurality of light beams emitted from the optical scanning device.

* * * * *